United States Patent [19]
Nimmo et al.

[11] Patent Number: 5,771,470
[45] Date of Patent: Jun. 23, 1998

[54] CONTROL OF A POWER AMPLIFIER STAGE OF A PORTABLE TRANSCEIVER

[75] Inventors: Ross Nimmo, Twickenham; David Smith, Silverburn, both of United Kingdom

[73] Assignee: Texas Instruments Incorporated, Dallas, Tex.

[21] Appl. No.: 521,901

[22] Filed: Aug. 31, 1995

[30] Foreign Application Priority Data

Aug. 31, 1994 [GB] United Kingdom ............... 9417690

[51] Int. Cl.⁶ ........................................... H04B 1/16
[52] U.S. Cl. .................. 455/572; 455/127; 330/277; 330/296
[58] Field of Search ............... 455/89, 116, 127, 455/343, 572, 575; 330/277, 136, 130, 296

[56] References Cited

U.S. PATENT DOCUMENTS

| | | | |
|---|---|---|---|
| 5,235,289 | 8/1993 | Kunimoto | 330/277 |
| 5,327,583 | 7/1994 | Yamada et al. | 455/127 |
| 5,465,400 | 11/1995 | Norimatsu | 455/123 |
| 5,548,247 | 8/1996 | Ogino et al. | 330/277 |
| 5,559,471 | 9/1996 | Black | 455/127 |

Primary Examiner—Edward F. Urban
Attorney, Agent, or Firm—Richard L. Donaldson; William B. Kempler

[57] ABSTRACT

A portable radio transceiver has a gallium arsenide depletion mode n-channel field-effect transistor as the transmitter power amplifier which needs a negative supply applied to its gate to establish the correct working point. A positive power supply provides the power input to the gallium arsenide transistor and a high side switch in the form of a PMOS enhancement mode transistor is used to switch the transmitter on and off. The negative supply is also used to forward bias the gate of the PMOS transistor when conducting so as to reduce its forward conduction resistance thereby enabling a smaller transistor to be used which can be integrated with other low power devices used by the transceiver.

14 Claims, 1 Drawing Sheet

CONTROL OF A POWER AMPLIFIER STAGE OF A PORTABLE TRANSCEIVER

BACKGROUND OF THE INVENTION

This invention relates to portable radio transceivers, such as portable telephones.

A major problem with portable telephones is providing sufficient battery capacity for long periods of use and to that end the circuits employed have been developed to operate on quite low voltages, such as 6 volts. Also, in the interests of economy of consumption the circuits of such telephones are predominantly in the form of integrated circuits using transistors of very small size, but such integrated circuits have limited power handling ability. That limitation is not a problem in the transmitter itself because the output power amplifier is usually a discrete device, such as a gallium arsenide transistor. However, there is a need to switch the power supply to the transmitter on and off and that operation is normally done by a conventional silicon MOS transistor. It would be desirable to integrate that transistor with the control and signal processing circuitry, but the power switching requirements of that transistor can mean that its size is incompatible with that of the other transistors so that the integration is undesirably complicated.

SUMMARY OF THE INVENTION

It is an object of the present invention to alleviate the problem just described.

According to the present invention there is provided a portable radio transceiver having a gallium arsenide depletion mode n-channel field-effect transistor as a transmitter power amplifier, means for providing a negative voltage supply that is connected to the gate of that transistor and a PMOS enhancement mode transistor that is switched by voltage applied to its gate to pass or to block a positive voltage supply to the gallium arsenide transistor to enable or disable transmission by the transmitter, in which the negative voltage supply is also used to augment the gate voltage applied to the PMOS transistor when conducting so as to reduce its resistance.

The reduction of the resistance of the PMOS transistor when it is conducting has the advantage that it enables a smaller transistor to be used than would be needed if the gate of the transistor were to be connected to ground (0 v). Ideally, the size of the transistor should be such that its geometry is compatible with that of transistors of an integrated circuit used to perform at least some of the functions of a portable telephone so that all the transistors can readily be formed in the same integrated circuit. The switching speed of the PMOS transistor may also be increased as a result of the reduction in size and the use of a larger swing in the gate driving voltage.

The invention will be described in its application to a portable telephone but it is also applicable to other apparatus such as portable radio transceivers for military and civil personal communications.

DESCRIPTION OF THE PREFERRED EMBODIMENT

Figure 1:
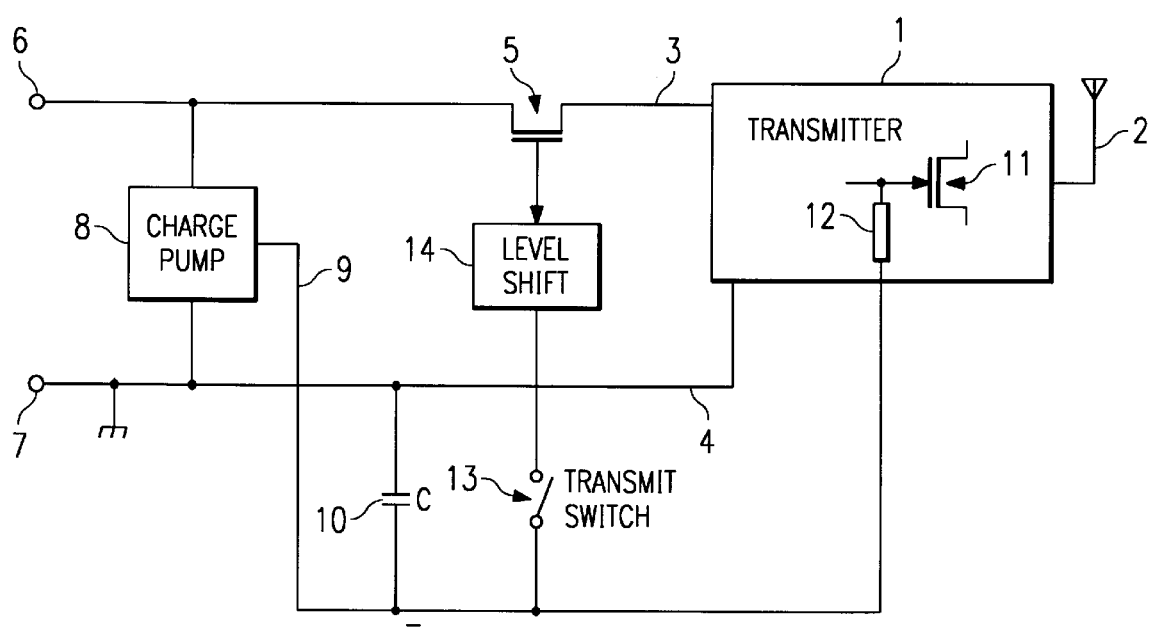
FIG. 1 is a diagram showing a power supply circuit for a portable radio transmitter.

In order that the invention may be fully understood and readily implemented, a power supply circuit for a portable radio transmitter will now be described with reference to the single figure of the accompanying drawing.

The single figure of the drawing shows a radio transmitter 1 connected to an antenna 2 and having power supply input conductors 3 and 4. The conductor 3 is connected through a PMOS transistor 5 to a terminal 6 for connection to the positive terminal of a battery (not shown). The conductor 4 is connected to chassis ground and to a terminal 7 for connection to the negative terminal of the battery. A charge pump 8 is also connected to the terminals 6 and 7 and serves to generate a negative supply voltage, relative to the conductor 4, on a conductor 9, which voltage is stored on a capacitor 10. As indicated, in the transmitter 1 the power amplifier is an n-channel gallium arsenide MESFET 11 which requires a negative bias on its gate for its operation driving a resonant tank circuit, for example, as a class C amplifier. The resonant tank circuit and the drive circuitry for the power amplifier are not shown because they may be of any suitable conventional form. The negative bias for the gate of the transistor 11 is derived from the conductor 9 by circuitry represented by the rectangle 12. The conductor 9 is also connected to the gate of the transistor 5 through a TRANSMIT switch 13 and a level shifter 14. The switch 13 is shown as a mechanical switch although in a practical circuit it is likely to be an electronic switch in the same integrated circuit as the transistor 5 and the level shifter 14.

Typically the battery voltage is between 4.5 and 7.5 volts and the negative voltage generated by the charge pump 8 and stored on the capacitor 10 lies between 3 and 6 volts.

The gallium arsenide transistor 11 is an n-channel depletion mode device and requires a negative bias on is gate to set it to its working point for operation so that it does not draw undue current and become overheated.

The circuit makes use of the negative supply needed by the gallium arsenide power amplifier transistor to enable a large voltage swing to be applied to the gate of the transistor 5. The transistor 5 is an enhancement-mode p-channel MOS device which is normally non-conducting and responds to a relatively large negative voltage, say −10 volts, on its gate relative to the source to become conducting very rapidly and to have a very low resistance. Whilst the transistor 5 could be switched to be conducting by a smaller negative voltage say −5 volts, which could be derived from the conductor 4 (at 0 volt). When operated under such conditions the transistor 5 would have a larger forward conduction resistance so that it would consume such an amount of power that dissipating the heat generated could be a problem in an integrated circuit. Moreover, the power consumed by the transistor 5 would detract from the power that could be generated by the power amplifier transistor 11. Whilst those difficulties could be overcome by making the transistor 5 a larger device, that would make it much harder to integrate with the other transistors used in the transceiver, as mentioned above.

It is desirable to arrange that should the negative supply fail for any reason then the transistor 5 would remain non-conducting so that no positive supply would be applied to the power transistor 11. The failure of the negative supply would mean that the negative bias is not applied to the gate of the power transistor 11, in which case if the positive supply were to be maintained the transistor would pass a large current which could damage or even destroy the transistor. Since the transistor 5 is a PMOS enhancement mode device its channel is non-conducting unless a suitable bias is applied to its gate, therefore what is required to ensure its non-conductive state if the negative supply were to fail is that either no voltage is applied to its gate or the gate voltage is non-negative. This precaution has the additional advantage that in normal operation the positive supply cannot be applied to the power transistor 11 before its negative bias, even if the negative supply is slow to build up.

The charge pump 8 used to generate the negative supply could be replaced by a suitable battery.

We claim:

1. A portable radio transceiver comprising:
   a gallium arsenide depletion mode n- channel field-effect transistor transmitter power amplifier;
   a source of positive potential coupled to said power amplifier;
   a source of reference potential coupled to said power amplifier
   a source of negative voltage with respect to said reference potential coupled to a gate of said power amplifier transistor;
   a PMOS enhancement mode transistor coupled between said positive potential source and said power amplifier to enable or disable transmission by the power amplifier, a gate of said PMOS transistor being coupled to said negative voltage source in said enable mode for driving said PMOS transistor to reduce its ON resistance.

2. A transceiver according to claim 1 wherein the PMOS transistor is included in an integrated circuit.

3. A transceiver according to claim 2 wherein the negative voltage supply is a charge pump powered by the positive voltage supply.

4. A transceiver according to claim 2 wherein the bias supply to the gate of the PMOS transistor is such that should the negative voltage supply fail the transistor does not become conducting.

5. A transceiver according to claim 1 wherein the negative voltage supply is a charge pump powered by the positive voltage supply.

6. A transceiver according to claim 5 wherein the bias supply to the gate of the PMOS transistor is such that should the negative voltage supply fail the transistor does not become conducting.

7. A transceiver according to claim 1 wherein the bias supply to the gate of the PMOS transistor is such that should the negative voltage supply fail the transistor does not become conducting.

8. A portable radio transceiver comprising:
   a gallium arsenide field-effect transistor transmitter power amplifier;
   a source of potential of a first polarity coupled to said power amplifier;
   a source of reference potential coupled to said power amplifier
   a source of voltage opposite in polarity with respect to said reference potential to said first polarity coupled to a gate of said power amplifier transistor;
   a MOS transistor coupled between said first polarity potential source and said power amplifier to enable or disable transmission by the power amplifier, a gate of said MOS transistor being coupled to said opposite polarity voltage source in said enable mode for driving said MOS transistor to reduce its ON resistance.

9. A transceiver according to claim 8 wherein the PMOS transistor is included in an integrated circuit.

10. A transceiver according claim 9 wherein the opposite polarity voltage supply is a charge pump powered by the first polarity voltage supply.

11. A transceiver according to claim 9 wherein the bias supply to the gate of the MOS transistor is such that should the opposite polarity voltage supply fail the transistor does not become conducting.

12. A transceiver according claim 8 wherein the opposite polarity voltage supply is a charge pump powered by the first polarity voltage supply.

13. A transceiver according to claim 2 wherein the bias supply to the gate of the MOS transistor is such that should the opposite polarity voltage supply fail the transistor does not become conducting.

14. A transceiver according to claim 8 wherein the bias supply to the gate of the MOS transistor is such that should the opposite polarity voltage supply fail the transistor does not become conducting.

\* \* \* \* \*